Feb. 7, 1967   T. D. BISHOP   3,302,490
METHOD OF MAKING AN ARCUATE FORME FOR CUTTING
AND CREASING SHEET MATERIAL
Filed Aug. 19, 1964
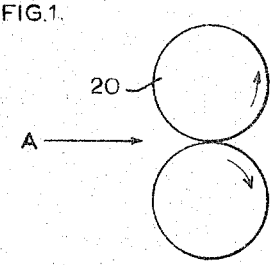
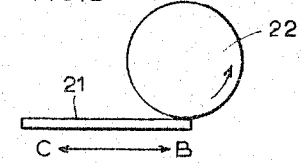
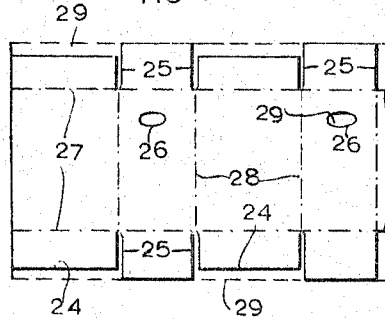
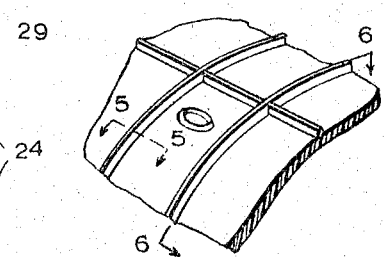
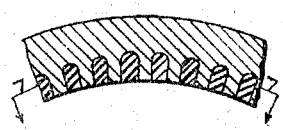
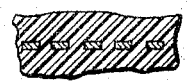
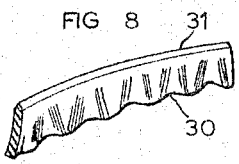
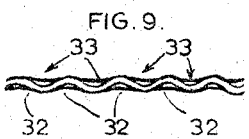
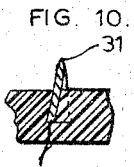
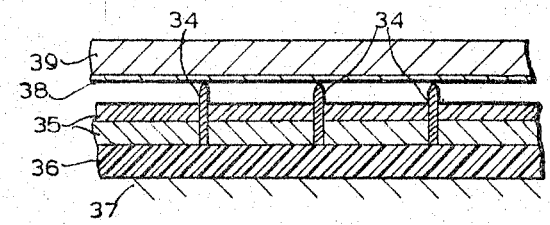

United States Patent Office 3,302,490
Patented Feb. 7, 1967

3,302,490
METHOD OF MAKING AN ARCUATE FORME FOR CUTTING AND CREASING SHEET MATERIAL
Thomas Desmond Bishop, Solihull, England, assignor to The Deritend Engineering Company Limited, Birmingham, England, a British company
Filed Aug. 19, 1964, Ser. No. 390,683
Claims priority, application Great Britain, Aug. 28, 1963, 33,971/63; Sept. 5, 1963, 35,028/63; Sept. 27, 1963, 38,086/63
1 Claim. (Cl. 76—107)

This invention relates to formes of the kind used in the cutting and creasing of paper, card, cardboard and like materials, comprising cutting rules made of thin strips of steel mounted edge-on to a plate; hitherto the mounting has been by means of brackets riveted, welded or otherwise secured to the rules and to the plate, or by the rules being wedged in saw-cut slots in a plywood plate. The free longitudinal edge of the rule is sharp if actual cutting is required, or is made tapered and blunted if creasing is required; for simplicity, this specification will use the term "cutting rule" to include both cutting and creasing rules.

The object of the present invention is to provide an improved construction of forme which is applicable where the forme plate is flat or arcuate.

In accordance with a broad aspect of the invention, a forme comprises a plate of soft material, preferably but not essentially of a thermoplastic resin material such as for example polythene, having at least one cutting rule part impressed in a slot or groove which may be continuous or discontinuous along its length but is essentially created by pressing the rule into the material.

The invention also consists in a method of making a forme comprising locating and supporting a cutting rule edgewise on a plate of soft material, preferably but not essentially of a thermoplastic resin material such as for example polythene, and applying pressure to the rule and/or plate to part embed the latter in a slot or groove created by the rule as it is embedded.

Whilst the invention may be applied to the production of a complete die for the production of a finished blank from a piece of board, i.e. one which has rules to form all cuts and creases at one operation, the invention is also applicable to the production of lesser parts, i.e. single rules each set in strips of the material for individual mounting on plates, roll cylinders and the like. This has advantages in certain instances, for example in enabling a rotary die-cutting machine to be used as a barbender, slotter, or the like. Also in particularly complicated dies used for short runs only, it may be more economic to build up a die on the platen or roll from individual pieces, rather than make a special one-piece forme.

The application of pressure may be carried out, for example, by supporting the rule between guide blocks of predetermined thickness proportional to the amount of the rule which is to project from the finished forme, placing a sheet of material across the cutting edges to protect them and a plate across the sheet, and then applying pressure.

The rule may have a notched edge opposite to the cutting edge so that the tongues of metal between notches enter the plate to produce a discontinuous slot or groove; in addition to facilitating the bending of the rule, this has the advantage of leaving the unslotted or ungrooved material as a series of reinforcements across the length of the rule and improving the hold effected by the inherent resilience of the plate material.

Alternatively the rule may have a sinuous edge produced without notching opposite its sharp edge and this sinuous edge is impressed into the plate material.

The rules may be pressed entirely through the plate thickness so that any backing cylinder or liner, or platen (in the case of flat formes) may apply pressure direct to the rule during actual cutting or creasing operations: however, in general such formation is only advantageous where the rule is notched because otherwise the plate is weakened by the slot accommodating the rule. Alternatively the rules may be impressed only partially through the plate material to permit further embedment of any high spots in the rules in operation.

The cutting edge of tthe rules may be coated with Tungsten Carbide to provide a hard long-wearing cutting edge.

For the purpose of facilitating ejection of cut material from the forme in operation rubber or like soft resilient material may be mounted on the face of the plate between the cutting rules.

For rotary operation a cylindrical forme constructed as above described coacts with an impression cylinder which may for example consists of a rubber cylinder carrying a hard steel sleeve to avoid excessive wear upon the rules.

The invention is now more particularly described with reference to the accompanying drawings, wherein:

FIG. 1 represents, diagrammatically, a roll couple of a rotary die-cutter;

FIG. 2 represents, equally diagrammatically, a reciprocating platen type of die-cutter;

FIG. 3 shows a blank cut and creased and ready for stripping;

FIG. 4 is a fragmentary perspective view of a forme;

FIG. 5 is a section, on an increased scale, on the line 5—5, FIG. 4;

FIG. 6 is a section, also on an increased scale, on the line 6—6 FIG. 4;

FIG. 7 is a section on the line 7—7, FIG. 6;

FIG. 8 is a fragmentary perspective view of one kind of rule, different from that shown in FIGS. 5-7;

FIG. 9 is an underside plan view of the rule of FIG. 8;

FIG. 10 is a view similar to FIG. 5 but showing the rule of FIGS. 8-9; and

FIG. 11 is a diagrammatic sectional elevation showing a method of assembly.

Referring first to FIGS. 1 and 2 these illustrate the two kinds of die-cutting in use and to which the invention is applicable. In FIG. 1, blanks are fed in the direction of arrow A between the (continuously) rotating roll pair of which one roll 20 carries a forme consisting of lengths of cutting or creasing rule so that in the nip the rules are driven through or into the board. In FIG. 2 the flat platen 21 carries the forme and the board and reciprocates first in direction B to take the board through the nip between the platen and impression roll 22 and then back in direction C for stripping of the board from the platen and replacement with the next. Of the two techniques, that of FIG. 1 is capable of faster running speeds but is a comparatively new technique and hitherto has been held back by lack of adequate, economic and efficient method of forme manufacture.

Purely by way of example, FIG. 3 illustrates a typical blank which is to be made from a plain planar board: it is to be cut along lines 24, 25, 26, these cuts passing through the board entirely; and creased along the chain-dot lines 27, 28. The pieces 29 are to be stripped off so that the finished blank can be created into a box with top and bottom flaps, sides, hand-holes etc. as will be understood. The blank may be treated to produce the cuts and creased by passing it either in the direction of its length or width as convenient, through the nip, FIG. 1 or 2.

In general there are three possible or likely kinds of rule; all consist essentially of steel or like strip with one lateral edge sharpened or blunted according to the desired function. One form, not illustrated, is plain, i.e. the rule strip is of constant width and thickness and is planar. A second form, preferred for use where the rule is to be curved along its length but remain flat and in one plane containing the centre of curvature is notched, i.e. formed with a series of regularly spaced slots extending from the lateral edge opposite to the cutting or creasing edge and towards the latter. The slots, when the rule is straight, preferably have parallel sides and semi-circular ends. When such rule is curved as shown in FIG. 6, the slots permit and facilitate the curvature, and the sides of the slots cease to be parallel and begin to converge towards the open slot ends. Furthermore, the slots allow forme plate material to extend across and through the rule, i.e. through the slots, so that although the rule may penetrate through the entire thickness of the material its strength is not seriously impaired.

The third type of rule is shown in FIGS. 8–10 and this utilises a sinuous configuration along the lateral edge 30 opposite to the cutting or creasing edge 31, so that a series of flutes or grooves 32, 33 of varying depth along their length (each extending transversely of the rule) are formed on alternate sides of the rule. When this rule is curved the depth of the flutes increases. It is desirable to only partly embed this rule in the forme, so that forme material on opposite sides of the rule is joined by material extending below the lateral edge of the rule opposite to the cutting edge.

In all cases the rules are to be embedded in material by a purely pressing action so that the rules cut slots for themselves in the forme material. The material for the forme should therefore be selected with this requirement in mind, and subject to it being readily possible to press the rules in, should be as tough and strong as possible. Synthetic resinous materials are preferred, particularly polyethylene and polypropylene which are readily obtainable in sheet or strip form and may be curved for use in rotary die-cutting, for example after heat-softening as is well known.

FIG. 11 of the accompanying drawings illustrates the basic method of forming the rules to cut their own grooves: this shows rules 34 which may be of any desired kind temporarily supported by blocks of any convenient material 35 which thus act as guides for the rules. The embedding edges of the rules abut a sheet of the forme material 36 e.g. plastics material which in turn is supported on a relatively rigid backing e.g. a platen or roll 37. The cutting etc. edges of the rules are covered by a sheet of, e.g. brass or steel 38, and the platen or roll 39 backs up the latter. If the set-up is to make a flat forme for use e.g. in the FIG. 2 arrangement, all of the parts 35–39 are flat, planar and parallel, so that a press operation may push the rules into the forme 36. It will be noted that the support blocks and guides 35 are made in laminations so that in successive operations the total thickness can be reduced so as to give optimum support at different stages.

Where the die is for use, e.g. in the FIG. 1 arrangement, it is preferred to close the nip between rolls 39, 37, to part-embed the rules, then angularly move the rolls to continue the embedding along the length of the rules: in successive rotations the nip may be closed and laminations removed from the supports as the embedding progresses. In this case the rules may be straight so as to be tangential to the forme or may be curved to fit on to the forme so that in the embedding the curvature is varied only slightly.

It will be appreciated that where the curvature is varied in the embedding due allowance must be made in calculating the lengths of curved rules.

Before use pads of foam plastics or rubber may be provided as at 40 (FIG. 5) on either side of each rule to act as strippers in known manner.

In the case of curved formes, the curvature may advantageously be such that the formes can snap on to the rolls: i.e. the forme may extend over slightly more than 180°.

Any suitable means may be provided to secure the formes in position on the platens or rolls such as clips, bolts, etc. Adhesive may also be used, possibly in association with abutments for the forme edges which serve to locate the forme circumferentially and parallel to the roll axis, whilst the adhesive serves or assists in preventing movement of the roll relative to the forme. This may be particularly advantageous where the forme is a narrow strip carrying only one rule.

I claim:

A method of making an arcuate forme for cutting and creasing sheet material, comprising the steps of supporting an arcuate plate of a tough, strong indentable material on a roll, supporting at least one rule for movement tangentially of the arcuate plate, in a position perpendicular to the surface of the plate, applying pressure to the working edge of the rule to indent the plate by embedding the opposite edge of the rule in the plate, rotating the roll and simultaneously moving the rule tangentially of the plate in the same direction and at the same velocity as the surface of the plate to continue the embedding of the rule in the plate.

References Cited by the Examiner

UNITED STATES PATENTS

| 3,052,139 | 9/1962 | Trimble | 76—107 |
| 3,170,358 | 2/1965 | Martin | 83—698 X |
| 3,203,295 | 8/1965 | Sauer | 83—698 X |

FOREIGN PATENTS 909,334  10/1962  Great Britain.

WILLIAM S. LAWSON, *Primary Examiner.*